Patented Nov. 2, 1948

2,452,971

UNITED STATES PATENT OFFICE 2,452,971

TREATMENT OF WATER

George P. Vincent, Briarcliff Manor, and James Douglas MacMahon, Niagara Falls, N. Y., and John Francis Synan, Fall River, Mass., assignors to Mathieson Chemical Corporation, a corporation of Virginia No Drawing. Application May 23, 1945, Serial No. 595,490

6 Claims. (Cl. 210—28)

This invention relates to improvements in the treatment of water and more particularly to improvement in the taste and odor of the finished water, especially with respect to mal-tastes and odors such as are frequently retained in water after a chlorine treatment or are developed or accentuated as a result of a chlorine treatment of the water.

Many cities and towns depend upon river, lake and other surface water for their water supply. Practically all such water has to be treated in various ways in order to make it safe or acceptable for human consumption. Ordinarily water of this type is clarified, filtered and disinfected. The usual method of disinfecting the water to free it of bacteriological infection, or to reduce bacteriological content to a safe range prescribed by State or municipal health departments, involves subjecting the water to a chlorine treatment.

Many water supplies are contaminated by industrial wastes, such as wastes containing phenol and related compounds and waste liquors from paper making operations. Other common sources of contamination are algae and other similar organisms, decayed vegetable matter, sewerage effluent and the like. Frequently the presence of such contaminants in the water supply results in disagreeable tastes or odors which are not ordinarily removed by chlorination, but which, in fact, are often developed or accentuated by the conventional chlorine treatment and make the water unsatisfactory for drinking or cooking purposes even though bacteriologically safe. Many methods have been developed and are being used in attempts to correct this objection but generally they have not been found completely satisfactory due either to lack of effectiveness, excessive cost, the inability to maintain adequate control or other difficulties.

A common cause of mal-tastes and odors of water is the presence in the water supply of phenols or related compounds. When such compounds are present in the water supply, even in extremely low concentrations insufficient to render the water objectionable, the chlorination of the water to render it bacteriologically safe has been found to result in an extremely objectionable taste and odor, apparently due to a reaction of the chlorine with the phenol or phenolic contaminants resulting in the formation of chlorophenolic or like compounds with a characteristic, so-called, chlorophenolic taste and odor.

This result of chlorine treatment of certain water has long been recognized in the art of water treating but previously suggested methods of overcoming the disagreeable consequences have generally not been wholly effective.

It has heretofore been proposed to alleviate the objectionable results of the chlorine treatment of such water by materially increasing the amount of chlorine used. For instance, there has been developed a method of treating water supplies known as "break-point chlorination." By this method improved results have been obtained in some instances, but frequently only at substantial economic sacrifice. Further, this method has not always been found to be effective or dependable. One objection to the break-point method is due to the fact that the concentration of contaminants in the water is subject to wide and frequent variation; consequently, the amount of chlorine necessary for satisfactory "break-point" operation is also subject to wide and frequent variation, rendering the operation a difficult one to control.

The phenomena which occur when chlorine is added to water are peculiar and not completely understood. At first, the chlorine is consumed in satisfying the "normal chlorine demand" of the water, which may be subject to wide variation, even when from the same source of water supply. As the chlorine dosage is increased beyond the demand of the particular water being treated, there develops in the water a chlorine residual. As the chlorine dosage is further increased, say from 1 part per million to 5 parts per million, the chlorine residual may increase, but, as the chlorine dosage is further increased, a maximum chlorine residual is sometimes reached and, as the chlorine dosage is increased beyond that which results in the maximum chlorine residual, there may occur a decrease in chlorine residual, sometimes the chlorine residual disappearing completely. Thereafter, as the chlorine dosage is further increased there usually occurs a rise in chlorine residual, usually in almost direct proportion to the increase in chlorine dosage. The point where this further rise occurs in the superchlorination of water is designated "break-point." The point varies with different waters and if chlorine residual be plotted against chlorine dosage, it will be found that there is a considerable variation in the shape of the resultant curve for different waters.

Where this method is used, it is sometimes found that the mal-taste and odor of the water, and particularly water containing phenolic contaminants, disappears at the break-point, but with a lesser chlorine dosage, the mal-taste and odor is accentuated. Frequently, the mal-taste and odor is not eliminated, even at the breakpoint.

We have discovered that the difficulty heretofore experienced may be avoided, and that improved results may be consistently obtained by subjecting the water to the action of chlorine dioxide prior to the chlorination treatment.

The chlorine treatment may be the conventional chlorination for the disinfecting of the water and may be carried out in conventional apparatus. However, by subjecting the water, containing contaminants such as previously noted, to a preliminary treatment with chlorine dioxide, in accordance with the present invention, the mal-tastes and odors characteristic of such water after chlorination may be completely avoided.

The treatment of water with chlorine dioxide has previously been suggested as a substitute for a chlorine treatment for the destruction of bacteria. Further, it has previously been observed that the treatment of water containing phenolic compounds with chlorine dioxide does not develop or accentuate mal-tastes and odors of the water. However, it has not previously been known that mal-tastes and odors present in the water, and which are not normally removed by chlorine treatment, can be removed by treating the water with chlorine dioxide followed by a chlorine treatment. Further, it was not known that the development or accentuation of mal-tastes and odors by chlorine treatment of the water can be avoided by treating the water with chlorine dioxide prior to the chlorination.

We have observed that in water treated in accordance with our present invention there is less tendency toward the development of mal-tastes and odors in the finished water upon long standing. Particularly, in water containing phenolic compounds which has been treated by previously known methods for eliminating mal-tastes and odors, for instance the "break-point" method of chlorination, there is a tendency toward a redevelopment of the mal-tastes and odors in the water on long standing. Water containing such phenolic compounds when treated in accordance with our present invention, is substantially free from this tendency.

The dosage of chlorine dioxide, in accordance with our present invention, may vary over a considerable range, the optimum dosage depending to a considerable extent upon the nature and concentration of the contaminants. Generally, satisfactory results may be obtained, in the absence of extreme variations in the nature of the water, by maintaining the chlorine dioxide dosage substantially constant at a value which has been found to be effective under the worse conditions usually encountered, and adjusting the subsequent chlorine dosage in accordance with conventional practice, as required by variations in the chlorine demand of the water.

Chlorine dioxide dosages within the range of about 0.1 to 10 parts of chlorine dioxide per million parts of water have been found effective in practically all cases encountered. Chlorine dioxide dosages within the range of about 0.5 to about three parts per million of water are usually effective under conditions normally encountered, depending upon the treatment to which the water is subjected prior to the chlorine dioxide treatment and also the condition of the raw water.

It will be understood that all reference herein, and in the accompanying claims, to the amounts or proportions of chlorine or chlorine dioxide used or contained in the water, is expressed in terms of the weight of available chlorine. Elemental chlorine, for instance liquid or gaseous chlorine, is, of course, 100% available chlorine. The available chlorine equivalent of chlorine dioxide is 253%.

In accordance with our present invention, chlorine dioxide, as such, may be introduced into the water being treated, or it may be generated in a relatively small proportion of the water, by known means, for instance by reacting a water-soluble chlorite, for instance sodium or calcium chlorite, with chlorine or with an acid. An advantageous method of treating the water with chlorine dioxide is to react chlorine and a chlorite in a relatively small flow of water and feed the water containing the generated chlorine dioxide into the main water flow prior to chlorination of the water. For instance, chlorine gas and an aqueous solution of the chlorite may, with advantage, be separately injected at a metered rate into the small flow of water. The two are then permitted to react to generate chlorine dioxide and the water containing the generated chlorine dioxide is admixed with the main flow of the water. Where chlorine is used for this purpose, an excess over that theoretically required to react with the chlorite may, with advantage, be used so as to induce rapid and complete conversion of the chlorite. The theoretical requirement is one mole of chlorine for each two moles of chlorine dioxide liberated, but it is usually desirable to use about twice that amount. A chemically equivalent portion of the chlorine so introduced rapidly reacts with the chlorite to form chlorine dioxide. Any excess chlorine which may ultimately pass to the chlorinating zone may be taken into account in determining the amount of chlorine used for disinfecting the water. The amount of chlorine thus introduced is normally much less than that required to disinfect the water.

It will be understood that the invention is independent of the particular method by which the chlorine dioxide is generated. Any other method of generating chlorine dioxide may be used, for instance the reaction of an acid with a chlorate. Accordingly, the expression "contacting the water with chlorine dioxide," appearing in the claims, must be understood to include the introduction of chlorine dioxide as such into the water as well as the generation or development of chlorine dioxide in the water.

The presence of excessive amounts of residual chlorine in the finished water is objectionable and is frequently removed by the usual conventional methods of dechlorination, for instance, by treatment with $SO_2$ or sulfite. Activated carbon has been used to assist in the removal of undesirable tastes and odors and when so used also acts as a dechlorinator.

An advantage of our present invention resides in the fact that water may be made potable and free from objectionable tastes and odors, without the use of excessive amounts of chlorine and the subsequent employment of dechlorinating agents to control the chlorine residual. Further, the use of activated carbon may be eliminated or, at least, the amount used substantially reduced. This also effects an additional economy by reducing the chlorine dosage otherwise required to maintain a safe chlorine residual in the distributing system.

The effectiveness of our improved method of treating water in controlling tastes and odors is demonstrated, and our invention is further illustrated by the following specific examples of its application.

Example I

A sample of raw water from the Great Lakes area was dosed with alum and activated carbon, settled for two hours and filtered. This treatment reduced the chlorine demand of the water from 1.2 P. P. M. to 0.8 P. P. M.

After filtering 0.01 P. P. M. phenol was added to the water which was then divided into portions. Separate portions were dosed with 0.1, 0.25, 0.50 and 1.0 P. P. M. chlorine dioxide respectively. After standing for 30 minutes, each portion was further subdivided and dosed respectively with 1.0, 1.2, 1.4 and 1.6 P. P. M. chlorine.

In all cases where the water was treated with 0.25 P. P. M. chlorine dioxide or higher, no chlorphenolic taste or odor was detected after dosing with chlorine. All portions dosed with 0.1 P. P. M. chlorine dioxide and duplicate portions which had no chlorine dioxide treatment developed a chlorphenolic taste and odor when treated with similar dosages of chlorine.

Example II

A sample of raw river water from the Great Lakes area to which had been added 0.02 P. P. M. phenol was divided into portions. These portions were dosed respectively with 0.4, 0.8, 1.2 and 1.6 P. P. M. chlorine dioxide, flocked with alum, settled for 2 hours and filtered. After filtering the portions were dosed with enough chlorine to retain a residual chlorine concentration of about 0.3 P. P. M.

The portion dosed with 0.4 P. P. M. chlorine dioxide had a distinct taste and odor of chlorphenol. The portion dosed with 0.8 P. P. M. chlorine dioxide showed an improvement over the 0.4 P. P. M. dosage. The portion dosed with 1.2 P. P. M. had a faintly detectable chlorphenolic taste and odor. No chlorphenolic taste and odor was detected in that portion dosed with 1.6 P. P. M. chlorine dioxide prior to the chlorination step.

Example III

Three portions of a sample of raw river water from the Pittsburgh area were respectively dosed with 0.5, 1.0 and 2.0 P. P. M. chlorine dioxide, flocked with alum and settled for about 2 hours, decanted and filtered. Just prior to filtration the three portions were dosed with sufficient chlorine to retain a residual chlorine concentration of about 0.3 P. P. M. Where the raw water was dosed and treated in the conventional manner with sufficient chlorine to give a like residual without the preliminary treatment with chlorine dioxide, a decidedly disagreeable taste and odor was present in the finished water.

The portion treated with 0.5 P. P. M. chlorine dioxide showed an improvement in the finished water over the portion not treated with chlorine dioxide but an appreciable taste and odor was apparent. The portion treated with 1.0 P. P. M. chlorine dioxide showed a decided improvement over the conventional method. There was, however, a slight but detectable taste and odor. Where the sample was treated with 2 P. P. M. chlorine dioxide, no objectionable taste and odor could be detected.

Example IV

A sample of raw surface water in the New England area contaminated with algae but containing no industrial wastes was divided into portions which were dosed with 1.0, 2.0, 3.0 and 4.0 P. P. M. chlorine dioxide respectively, flocked, settled for about 2 hours and then filtered. The filtered water was then dosed with 1.0 P. P. M. chlorine. Another portion was not given a preliminary chlorine dioxide treatment but was otherwise treated in the same manner as described above. Subsequent to filtration this portion was dosed with sufficient chlorine to retain a residual chlorine concentration of about 0.3 P. P. M., in accordance with common water works practice. This portion exhibited an objectionable taste and odor characteristic of algae.

The portion treated with 1.0 P. P. M. chlorine dioxide showed improvement over the conventional method of treatment. The portion treated with 2.0 P. P. M. showed a marked improvement over the conventional method of treatment. However, those portions treated with 3.0 and 4.0 P. P. M. were free from the characteristic algae taste and odor.

It will be understood that with different waters the minimum requirement of chlorine dioxide to provide complete protection against mal-taste and odor in the finished water will vary. The optimum dosage of chlorine dioxide will depend to a considerable extent upon the condition of the water, as previously noted, and may be readily determined by simple tests. In general, increase in concentration of phenolic compounds, or other contaminants of the types noted, in the water will require the use of an increased amount of chlorine dioxide in the pretreatment to afford adequate protection against development of mal-tastes and odors by the subsequent chlorination.

The chlorine dosage may be determined in conventional manner. The subsequent chlorination in accordance with this invention may with advantage be superchlorination. Chlorination may be applied at any point subsequent to the chlorine dioxide treatment for instance before or after filtration.

The invention is useful where the break-point method of chlorination is not wholly effective in adequately controlling tastes and odors or where greater or lesser amounts of chlorine are employed.

It will be understood that the invention is useful generally in removing from water mal-tastes and odors due to the presence of contaminants of the types previously noted and in preventing the development or accentuation of such mal-tastes and odors by the chlorination step.

During certain seasons, surface water will frequently be contaminated by algae which contribute to objectionable tastes and odors of the water, some of which tastes and odors are normally accentuated by the conventional chlorine treatment. By treating such water in accordance with my present invention, the inherent tastes and odors due to algae and other similar microorganisms, or the development or accentuation of such objectionable tastes and odors by the usual chlorine treatment, may be prevented or minimized. It will be understood that reference to algae in the appended claims is intended to include, in addition to algae, other similar microorganisms.

It will further be understood that reference in the claims to phenol or phenolic compounds is intended to include not only phenols but also related compounds, for instance cresols, xylenols and the like. It will further be understood that the invention is applicable generally to the treatment of water by chlorination whether or not the

We claim:

1. In the disinfecting of water by chlorination, the improvement which comprises improving the taste and odor of the resultant water by contacting the water with chlorine dioxide in such manner as to dissolve therein from about 0.1 to about 10 parts of chlorine dioxide per million parts of water, and thereafter adding to the thus-treated water an amount of chlorine at least sufficient to disinfect the water to render it potable.

2. In the chlorination of water contaminated by the presence of a material which reacts with chlorine to develop and accentuate mal-tastes and mal-odors in the finished water, the improvement which comprises improving the taste and odor of the resultant water by contacting the water with chlorine dioxide in such manner as to dissolve therein from about 0.1 to about 10 parts of chlorine dioxide per million parts of water, and thereafter adding to the thus-treated water an amount of chlorine at least sufficient to disinfect the water to render it potable.

3. In the chlorination of water contaminated by the presence of phenolic compounds, the improvement which comprises improving the taste and odor of the resultant water by contacting the water with chlorine dioxide in such manner as to dissolve therein from about 0.1 to about 10 parts of chlorine dioxide per million parts of water, and thereafter adding to the thus-treated water an amount of chlorine at least sufficient to disinfect the water to render it potable.

4. In the chlorination of water from a raw water source containing algae, the improvement which comprises improving the taste and odor of the resultant water by contacting the water with chlorine dioxide in such manner as to dissolve therein from about 0.1 to about 10 parts of chlorine dioxide per million parts of water, and thereafter adding to the thus-treated water an amount of chlorine at least sufficient to disinfect the water to render it potable.

5. In the chlorination of water the improvement which comprises improving the taste and odor of the resultant water by contacting the water with chlorine dioxide in such manner as to dissolve therein from about 0.1 to about 10 parts of chlorine dioxide per million parts of water, and thereafter adding to the thus-treated water an amount of chlorine sufficient to effect superchlorination.

6. In the chlorination of water contaminated by the presence of a material which reacts with chlorine to develop and accentuate mal-tastes and mal-odors in the finished water, the improvement which comprises improving the taste and odor of the resultant water by contacting the water with chlorine dioxide in such manner as to dissolve therein from about 0.1 to about 10 parts of chlorine dioxide per million parts of water, and thereafter adding to the thus-treated water an amount of chlorine sufficient to effect superchlorination.

GEORGE P. VINCENT.
JAMES DOUGLAS MacMAHON.
JOHN FRANCIS SYNAN.

REFERENCES CITED

The following references are of record in the file of this patent:

UNITED STATES PATENTS

| Number | Name | Date |
|---|---|---|
| 1,197,640 | Kreigsheim | Sept. 12, 1916 |
| 1,229,305 | Menzies | June 12, 1917 |
| 1,324,118 | Hottinger et al. | Dec. 9, 1919 |
| 1,750,561 | Adler et al. | Mar. 11, 1930 |
| 1,943,650 | Baker | Jan. 16, 1934 |

FOREIGN PATENTS

| Number | Country | Date |
|---|---|---|
| 3,529 | Great Britain | 1913 |
| 4,917 | Great Britain | 1898 |
| 19,722 | Great Britain | 1914 |
| 22,048 | Great Britain | 1914 |